(12) United States Patent
Hariharan

(10) Patent No.: US 10,355,880 B2
(45) Date of Patent: Jul. 16, 2019

(54) SYSTEM FOR COMMUNICATING DATA

(71) Applicant: WATCHY TECHNOLOGY PRIVATE LIMITED, Karnataka (IN)

(72) Inventor: Sriramkumar Vanamurthy Hariharan, Chennai (IN)

(73) Assignee: WATCHY TECHNOLOGY PRIVATE LIMITED (IN)

(*) Notice: Subject to any disclaimer, the term of this patent is extended or adjusted under 35 U.S.C. 154(b) by 40 days.

(21) Appl. No.: 15/501,441

(22) PCT Filed: Sep. 29, 2015

(86) PCT No.: PCT/IB2015/057434
§ 371 (c)(1),
(2) Date: Feb. 3, 2017

(87) PCT Pub. No.: WO2016/020904
PCT Pub. Date: Feb. 11, 2016

(65) Prior Publication Data
US 2017/0230200 A1 Aug. 10, 2017

(30) Foreign Application Priority Data
Aug. 6, 2014 (IN) .............. 3852/CHE/2014

(51) Int. Cl.
H04L 12/46 (2006.01)
H04N 1/00 (2006.01)
H04W 28/02 (2009.01)
H04L 12/709 (2013.01)
H04L 12/805 (2013.01)
(Continued)

(52) U.S. Cl.
CPC ...... *H04L 12/4641* (2013.01); *H04L 12/4633* (2013.01); *H04L 45/245* (2013.01); *H04L 47/365* (2013.01); *H04L 69/16* (2013.01); *H04N 1/00* (2013.01); *H04N 19/645* (2014.11); *H04W 28/0273* (2013.01); *H04W 40/00* (2013.01);
(Continued)

(58) Field of Classification Search
CPC ... H04L 12/4641; H04L 47/365; H04L 69/16; H04L 12/4633; H04L 45/245; H04L 45/00; H04N 19/645; H04N 1/00; H04W 28/0273; H04W 84/02; H04W 40/00; H04W 84/06; H04W 40/04
USPC .................................. 370/395.52
See application file for complete search history.

(56) References Cited

U.S. PATENT DOCUMENTS 7,643,427 B2* 1/2010 Kokku ............... H04L 45/00
370/237
2011/0296006 A1* 12/2011 Krishnaswamy ....... H04L 45/00
709/224

(Continued)

*Primary Examiner* — Brian T O Connor

(57) ABSTRACT

A system (100) for communicating data may include a first device (102) and a second device (104). The first device (102) may include a first processor (112) and a plurality of WWANs (118). The first processor (112) may execute a first MPTCP (204) and a plurality of first VPNs (206). The first device (204) may be configured to receive and segregate a stream of packets of data into a plurality of data blocks (Db). The first MPTCP (204) and the plurality of WWANs (118) may coordinate to provide multiple data paths based on the bandwidth of each of the plurality of WWANs (118) for transmitting the plurality of data block (Db). The plurality of data blocks may be received by the second device (104) to be further processed and sent to a desired destination.

10 Claims, 4 Drawing Sheets

(51) Int. Cl.
*H04W 40/00* (2009.01)
*H04N 19/645* (2014.01)
*H04L 29/06* (2006.01)
*H04W 84/02* (2009.01)
*H04L 12/24* (2006.01)
*H04W 84/06* (2009.01)

(52) U.S. Cl.
CPC ......... *H04W 84/02* (2013.01); *H04L 41/5003* (2013.01); *H04W 84/06* (2013.01)

(56) References Cited

U.S. PATENT DOCUMENTS

| | | | |
|---|---|---|---|
| 2015/0271865 A1* | 9/2015 | Carson | H04L 45/245 370/329 |
| 2018/0241696 A1* | 8/2018 | Sindhu | H04L 49/10 |

* cited by examiner

SYSTEM FOR COMMUNICATING DATA

BACKGROUND

Field

The subject matter in general relates to live broadcasting, browsing, uploading and downloading activities, among others. More specifically but not exclusively, the subject matter relates to communicating data through plurality of wireless wide area networks.

Discussion of Related Art

Videos coverage of events and live broadcast of the same is being done using a variety of technologies. Generally, broadcasting live video is done using mobile satellite internet. The mobile satellite internet is used mainly by the professional television networks, which is generally carried on top of a vehicle. Such a solution requires significant investment.

Another conventional technology for broadcasting live video involves uploading the video stream through the interne. It can be achieved through broadband connection which has a high bandwidth. However, broadband connection with high bandwidth may not be available at all the locations where events have to be covered live.

In other conventional technology, broadcasting live video may be achieved by using cellular data connection. Some of the cellular data connections include LTE, WImax, UMTS, CDMA and GSM. However, such cellular data connection may have constraints in pushing rich content of video or large pictures, since its bandwidth may be relatively less compared to broadband connections and may keep fluctuating over time.

In light of the foregoing discussion, there is a need for an alternative technique to enable at least live broadcasting. The technique may be extended to general internet browsing, uploading and downloading activities, among others.

SUMMARY

Embodiments relate to a system for communicating data packets. The system may include a first device and a second device. The first device may include a first processor and a plurality of wireless wide area networks. The first processor may execute a first multipath transmission control protocol and a plurality of first virtual private networks. The first device may be configured to receive and segregate a stream of packets of data into a plurality of data blocks. The first multipath transmission control protocol and the plurality of wireless wide area networks coordinates with each other to provide a data path based on the bandwidth of each of the plurality of wireless wide area networks for transmitting the plurality of data block. The plurality of data blocks are received by the second device to be further processed and sent to a desired destination.

BRIEF DESCRIPTION OF DRAWINGS

Embodiments are illustrated by way of example and not limitation in the Figures of the accompanying drawings, in which like references indicate similar elements and in which.

DETAILED DESCRIPTION

Figure 1:
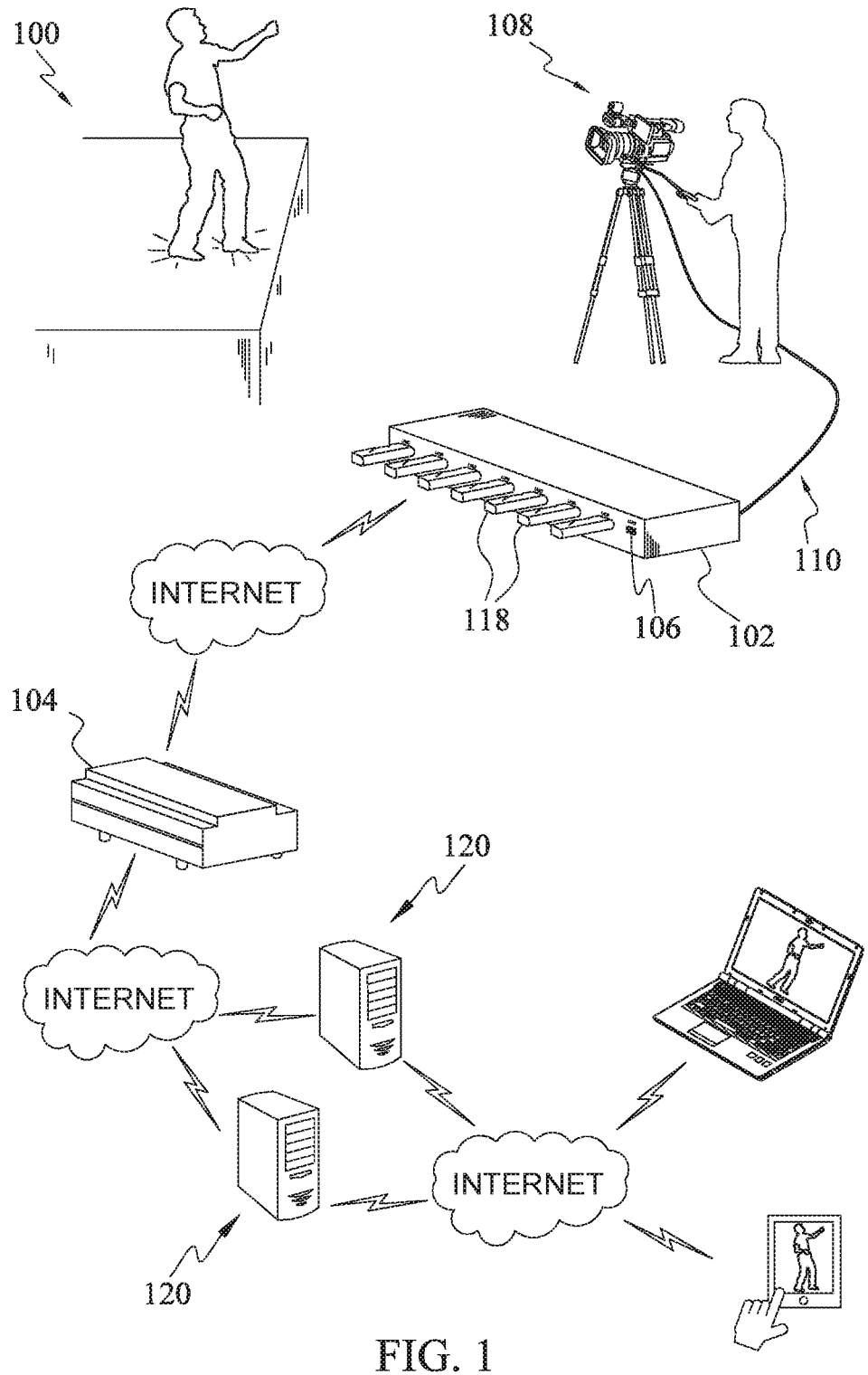
FIG. 1 illustrates the arrangement of a system 100 for enabling communication of data packets, in accordance with an embodiment.

I. Overview
II. Exemplary System
III. Exemplary Working of the System
IV. Conclusion

I. OVERVIEW

An embodiment may provide a system that may be used to enable live digital media broadcasting. For example, the system may be used to broadcast an event, such as a wedding, and may be used to cover news. Such events may be watched live by users. A video camera may be used to shoot the event. The video camera may be connected to a first device to receive stream of data packets from the video camera. The first device may transmit the data packets over the internet to a second device. The second device may transmit the data packets to its intended destination, such as Google Hangout platform. Users may access such platforms to watch the event live. It may be noted that communicating data packets from the location where the event is occurring may be difficult if the internet connectivity of desired bandwidth is not available; and in many circumstances such desired bandwidth may be absent. Hence to address the above difficulty, the first device may be configured to receive multiple Wireless Wide Area Networks (WWAN) in the form of, for example, dongles and SIM cards, for various service providers, such as, Airtel and Vodafone. The first device may use bandwidth provided by these multiple WWAN to enable live streaming of digital media.

The first device may include a first processor, a first multipath transmission control protocol executed on the processor, a plurality of first virtual private networks executed on the processor and a plurality of wireless wide area networks. The first processor may be configured to receive a stream of packets of data from a data source, such as a video camera, which may be connected to an encoder. The first multipath transmission control protocol may segregate the stream of packets of data into a plurality of data blocks. The plurality of first virtual private networks may receive the plurality of data blocks based on an allocation made by the first multipath transmission control protocol. Each of the wireless wide area networks may be associated with a respective one of the plurality of first virtual private networks. Each of the plurality of wireless wide area networks may provide a data path for transmitting one or more data blocks allocated to the associated virtual private network.

The first multipath transmission control protocol may monitor each of the plurality of virtual private networks associated with wireless wide area networks to decide on allocation of data blocks to the first virtual private networks based on performance capability of the plurality of wireless wide area networks. The first multipath transmission control protocol may coordinate with the wireless wide area networks for selecting one or more data paths for transmitting the stream of packets of data. The first multipath transmission control protocol may select the data paths based on size of the stream of packets of data to be transmitted and bandwidth of each of the plurality of wireless wide area networks.

The second device may include a second processor, a second Ethernet device associated with at least one remote virtual private network executed on the second processor and a second multipath transmission control protocol executed on the second processor. The remote virtual private network may be configured to receive the plurality of data blocks, via the second Ethernet device, transmitted by the plurality of wireless wide area networks. The second multi path transmission control protocol may configure the second processor to receive the data blocks from the remote virtual private network and assemble the data blocks to obtain a logical sequence of packets of data. The second device may eventually transmit the packets of data to a desired destination (using the second Ethernet device), such as, a Google Hangout platform. Users or viewers may access the platform to watch the event live.

The following detailed description includes references to the accompanying drawings, which form part of the detailed description. The drawings show illustrations in accordance with example embodiments. These example embodiments are described in enough detail to enable those skilled in the art to practice the present subject matter. However, it will be apparent to one of ordinary skill in the art that the present invention may be practiced without these specific details. In other instances, well-known methods, procedures and components have not been described in detail so as not to unnecessarily obscure aspects of the embodiments. The embodiments can be combined, other embodiments can be utilized or structural and logical changes can be made without departing from the scope of the invention. The following detailed description may, therefore, not to be taken as a limiting sense.

In this document, the terms "a" or "an" are used, as is common in patent documents, to include one or more than one. In this document, the term "or" is used to refer to a nonexclusive "or," such that "A or B" includes "A but not B," "B but not A," and "A and B," unless otherwise indicated.

II. EXEMPLARY SYSTEM

Referring to the figures, a system 100 may be provided for communicating data packets. FIG. 1 illustrates the arrangement of the exemplary system 100 for enabling communication of data packets, in accordance with an embodiment. The system 100 may include a first device 102 and a second device 104.

Referring to FIG. 2 as well, the first device 102 may include a first processor 112. The first device 102 may further include a plurality of Universal Serial Bus (USB) ports 106. Further, each of the plurality of USB ports 106 in the first device 102 may be such that, each of the USB ports 106 may be connected with a Wireless Wide Area Network (WWAN) 118.

In an embodiment, the first device 102 may receive a stream of packets of data from a data source 108. The data source 108 may be, for example, a video capturing device, an audio capturing device, an image capturing device, laptop, desktop and a data storage device, among many others.

In an embodiment, the first processor 112 configures the first device 102 to receive data from the data source 108 through a communication module 110. The communication module 110 may be a wired network, a wireless network or a combination of wired and wireless network.

In an embodiment, WWAN 118 may be a WWAN configured to transmit and receive data between the first device 102 and the second device 104.

In another embodiment, the WWAN 118 may be such that it has a slot to receive a subscriber identity module card, wherein the subscriber identity module card enables communicating, or transferring and receiving of data between the first device 102 and the second device 104.

In another embodiment, the wireless wide area network 118 may be a device enabled with a code division multiple accesses (CDMA) modem configured to transmit and receive data between the first device 102 and the second device 104.

In an embodiment, the second device 104 may include a second processor 114. The second processor 114 may configure the second device 104 to receive data from the first device 102.

In an embodiment, the second processor 114 may configure the second device 104 to process the data received from the first device 102 and transfer the processed data to a desired destination system 120, such as a platform that enables users to access the platform and watch live video (Ex: Google Hangout). The second device 104 may transfer the data to an intended destination or an intermediate to the intended destination.

Figure 2A:
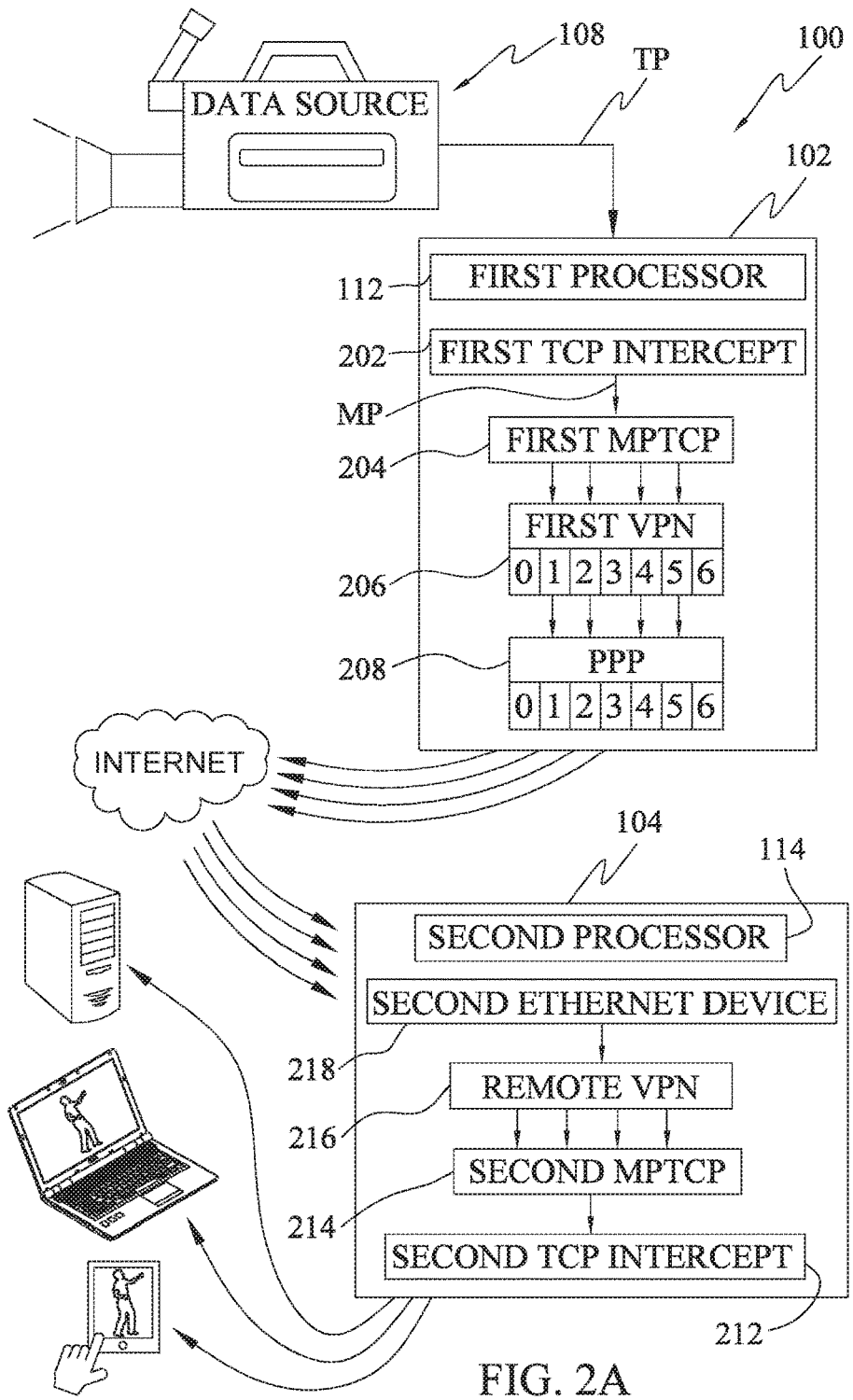
FIG. 2A illustrates a block diagram of the exemplary system 100 for enabling communication of data packets, in accordance with an embodiment.

FIG. 2A is a block diagram of the exemplary system 100 for enabling communication of data packets, in accordance with an embodiment. The first device 102 may include a first Transmission Control Protocol (TCP) intercept 202 executed on the first processor 112. The first device 102 may further include a first Multi-Path Transmission Control Protocol (MPTCP) 204 executed on the first processor 112 and a plurality of first Virtual Private Networks (VPNs) 206 executed on the first processor 112. The plurality of WWANs 118 that may be connected to the USB ports 106 in the first device 102 may be referred to as a plurality of Point-to-Point Protocol (PPP) 208 in the block diagram. Each of the point to point protocols 208 may provide a data path for transmitting data from the first device 102 to the second device 104, through virtual private network(s). It may be noted that, the concepts of the disclosure may be used in the scenario of Ethernet or among other related technologies, instead of or in combination with PPP.

In an embodiment, the first transmission control protocol intercept 202 executed on the first processor 112 may configure the first device 102 to receive the stream of packets of data from the data source 108. The first transmission control protocol intercept 202 may act as an intermediary to modify the stream of packets of data which may be in the form of transmission control protocol sockets (Tp) to multipath transmission control protocol sockets (Mp).

In an embodiment, the first MPTCP 204 may configure the first processor 102 to receive the multipath transmission control protocol sockets (Mp).

In an embodiment, the first MPTCP 204 may configure the first processor 102 to monitor bandwidth (Bw) of each of the plurality of point to point protocol 208.

In an embodiment, the first MPTCP 204 may configure the first processor 102 to monitor the data size of the stream of packets of data received, which may be in the form of multipath transmission control protocol sockets (Mp).

In an embodiment, the first MPTCP 204 may configure the first processor 102 to coordinate with the first virtual private networks 206 for segregating the stream of packets of data into plurality of data blocks (Db).

In an embodiment, the first MPTCP 204 may further configure the first processor 112 to allocate data blocks to one or more first virtual private networks 206 based on performance capability of the plurality of wireless wide area network 118.

In an embodiment, the first multipath transmission control protocol 204 may configure the first processor 102 to allocate each of the data blocks (Db) to one or more first virtual private network 206 based on bandwidth identified, for example by monitoring, at each of the virtual private networks 206 and the data size of the stream of packets of data received at the first MPTCP 204.

In an embodiment, the each of the point to point protocols 208 may receive the data block allocated to its associated first virtual private network 206. The plurality of point to point protocols 208 provide data paths for transmitting data blocks allocated to their associated virtual private networks.

In an embodiment, the first MPTCP 204 may configure the first processor 112 to gather details corresponding to the virtual private networks 206, thereby the point to point protocols 208. The details may include, but not limited to, speed, network strength, service provider and performance of each of the point to point protocol 208, among other.

In an embodiment, the first MPTCP 204 may configure the first processor 102 to coordinate with the virtual private networks 206, thereby the plurality of point to point protocols 208, segregate or allocate or divide the stream of packets of data into plurality of data blocks, such that the second device 104 may receive the plurality of data blocks (Db) within a short duration of buffer period.

The data blocks (Db) received at the first VPNs 206 may be encapsulated with an virtual private network encapsulation header, wherein the encapsulation may be a 7-octet VPN ID which may include virtual private network related OUI (3 octets) and virtual private network Index (4 octets).

In an embodiment, the data blocks (Db) received at the first VPNs 206 may use different methods for encrypting the data blocks. The encryption at the first VPNs 206 may be done using Secure Sockets Layer (SSL).

In an embodiment, the data block (Db) received at the first VPNs 206 may be tunnelled, for example, using routing encapsulation tunnelling.

In an embodiment, the plurality of data blocks encapsulated and encrypted by the first VPNs 206 may be tunnelled through the plurality of point to point protocols 208.

In an embodiment, the second processor 114 may configure the second device 104 to receive the plurality of data blocks (Db) transmitted by the plurality of point to point protocols 208, via the second Ethernet device 218.

In an embodiment, the second processor 114 may configure the second device 104 such that it receives each of the plurality of data blocks (Db) within a short duration of buffer period.

In an embodiment, the second device 104 may include a remote Virtual Private Network (VPN) 216 executed on the second processor 114, a second MPTCP 214 executed on the second processor 114 and a second TCP intercept 212 executed on the second processor 114.

In an embodiment, the remote VPN 216 may configure the second device 104 to receive the plurality of data blocks (Db) from the first VPNs 206 via the internet. The remote VPN 216 may strip the encapsulation and decrypt the plurality of data blocks (Db).

In an embodiment, the second MPTCP 214 executed on the second processor 114 may configure the second device 104 to process the plurality of the data blocks (Db) received by the remote VPN 216. Further, the second MPTCP 214 may configure the second device 104 to assemble the plurality of data blocks and obtain a logical sequence of the data blocks (Db). The second MPTCP 214 may be configured to provide a buffer period for receiving the stream of data blocks so that they can be arranged in a logical sequence. The buffer period for example may be three second. In that buffer period, the second MPTCP 214 may verify whether the data blocks that are required to arrive at the logical sequence of data stream are received. The data blocks may be processed and prepared for communication to the desired destination, if the data blocks have arrived. On the other hand, if the some of the data blocks have not arrived within the buffer period, then the same may be communicated to the first MPTCP 204. The first MPTCP 204 may then reseed data blocks corresponding to a respective stream again. It may be noted that, the buffer period may be modified based on the performance. In an embodiment, the buffer period may be dynamically modified based on the performance. The second MPTCP 214 may be configured to dynamically modify the buffer period.

In an embodiment, the data blocks (Db) processed by the second MPTCP 214 may be further processed by the second TCP intercept 212 to modify the data blocks (Db), which may be in the form of multipath transmission control protocol sockets to transmission control protocol sockets. The second TCP intercept 212 may enable the transmission of the modified stream of packets of data to at least one remote destination 120, in the form of transmission control protocol sockets.

Figure 2B:
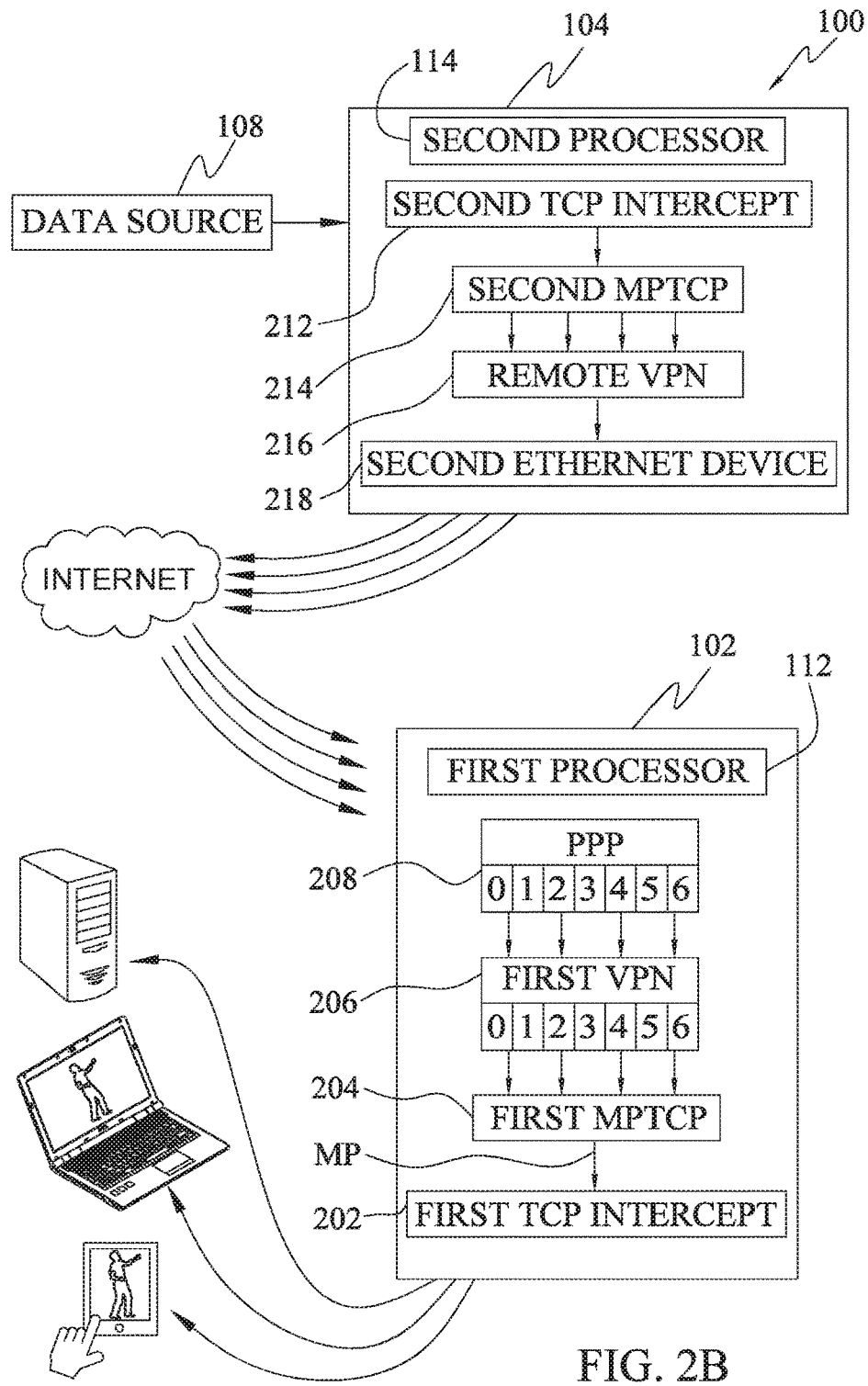
FIG. 2B illustrates a block diagram of the exemplary system 100 for enabling communication of data packets, in accordance with another embodiment.

FIG. 2B is a block diagram of the exemplary system 200 for enabling communication of data packets, in accordance with another embodiment. The second device 104 may be configured by the second processor 114 to receive the stream of packets of data from the data source 108. The second TCP intercept 212 executed on the second processor 112 may configure the second device 104 to receive a stream of packets of data from the data source 108. The second TCP intercept 212 may act as an intermediary to modify the stream of packets of data which may be in the form of transmission control protocol sockets (Tp) to multipath transmission control protocol sockets (Mp).

In an embodiment, the second MPTCP 214 may receive the stream of packets of data from the second TCP intercept 212, which may be in the form of multipath transmission control protocol sockets (Mp). Further, the second multipath transmission control protocol 214 may configure the second device 104 to segregate the stream of packets of data into a plurality of data blocks (Db).

In an embodiment, the first processor 112 may configure the first device 102 to establish a data path with the second device 104 through at least one of the plurality of point to point protocol 208. The first device 102 while establishing communication with the second device 104 may inform the second device 104 about the plurality of point to point protocols 208 available. The capabilities of each of the first VPNs 206, thereby the point to point protocols 208 may also be communicated. Further, the performance of the point to point protocols 208 may also be communicated to the second device 104 and/or monitored by the second device 104, while communicating with the first device 102.

In an embodiment, the second MPTCP 214 may prepare the plurality of data blocks (Db) based on the data size of the stream of packets of data, and transmit the same to the remote virtual private network 216 for transmission via one or more data paths associated with the first VPNs 206. The data paths to be used and/or the data block size into which the stream may be divided may be determined based on the capability of the point to point protocols 208.

In an embodiment, the plurality of data blocks (Db) received at the remote VPN 216 may be encapsulated and/or encrypted by the remote VPN 216. The processed data blocks (Db) are sent to the first device 102 via internet.

In an embodiment, the first VPNs 202 executed on the first processor 112 may configure the first device 102 to receive the plurality of data blocks (Db) via the Internet through the plurality of point to point protocol 208.

In an embodiment, the first VPNs 202 executed on the first processor 112 may configure the first device 102 to receive the plurality of data blocks (Db) from the internet through the plurality of point to point protocol 208. The first VPNs 206 executed on the first processor 112 may strip the encapsulation of the plurality of data blocks (Db).

In an embodiment, the first MPTCP 204 executed on the first processor 112 may configure the first device 102 to process the plurality of the data blocks (Db) received by the first VPNs 202. Further, the first MPTCP 214 may configure the first device 102 to assemble the plurality of data blocks and obtain a logical sequence of the data blocks (Db).

In an embodiment, the data blocks (Db) processed by first MPTCP 204 may be further processed by the first TCP intercept 204 to modify the data blocks, which may be in the form of multipath transmission control protocol sockets, to transmission control protocol sockets. The first TCP intercept 202 may enable the transmission of the modified stream of packets of data at least one destination, wherein the data may be in the form of transmission control protocol sockets. It may be noted that the TCP intercept may reuse the same socket for the corresponding MPTCP session.

Exemplary Working of System

Figure 3:
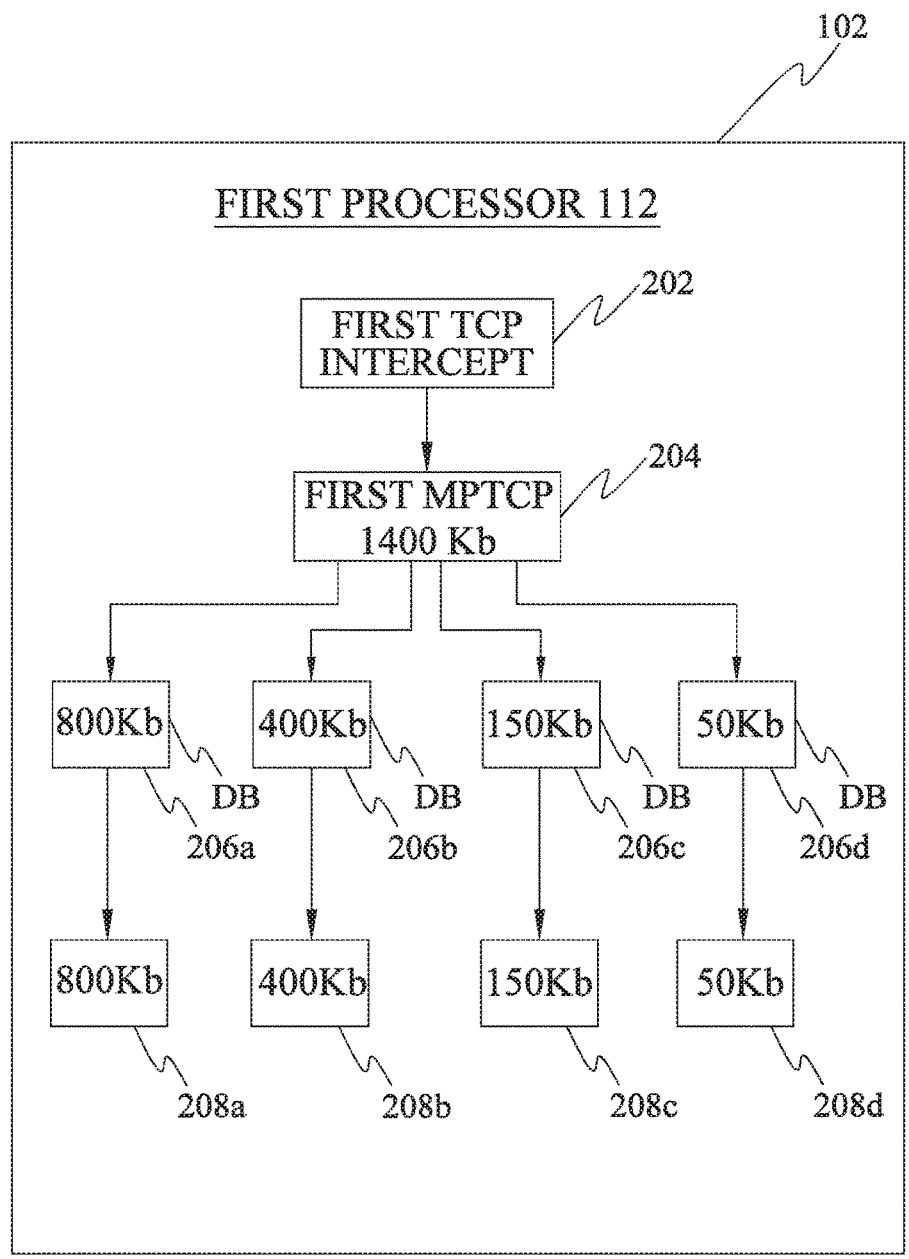
FIG. 3 illustrates a block diagram of a first device 102 dividing a stream of packets of data into a plurality of data blocks.

In reference to FIG. 1 to FIG. 3, the data source 108 may be a video capturing device, which may capture motion pictures at 24 fps. The first device 102 receives the motion picture, which may be in the form of transmission control protocol sockets. The first transmission control protocol intercept 202 executed on the first processor 112 may convert the transmission control protocol sockets into the multipath transmission control protocol sockets. The plurality of point to point protocols 208 may include a first point to point protocol 208a, a second point to point protocol 208b, a third point to point protocol 208c and a fourth point to point protocol 208d having different bandwidth, and may even correspond to different technologies (Example: 2G, 3G and 4G). The bandwidth capability, as determined or measured or monitored by first processor 112, of the first point to point protocol 208a may be 1.024 mbps, the second point to point protocol 208b may be 512 kbps, the third point to point protocol 208c may be 256 kbps and the fourth point to point protocol 208d may be 128 kbps.

The first MPTCP 204, may divide the data stream into data blocks and allocate data blocks for transmission to one or more of the point to point protocol 208a, 208b, 208c and 208d based on bandwidth capability of each of the point to point protocols. It may consider size of the data to be transmitted. It may further consider, buffer period. It may additionally consider cost of transmission associated with each of the point to point protocols. In addition, it may consider performance of the point to point protocols. The segregation of the data blocks may be such that the second device 104 receives the logical sequence of data blocks within a short duration.

The size of stream of data packets received by the first device 102 may be 1400 kb. The stream may be divided into a first data block of 800 kb, a second data block of 400 kb, a third data block of 150 kb and a fourth data block of 50 kb. The first data block of 800 kb may be allocated, for transmission, to the first point to point protocol 208a having a bandwidth of 1.024 mbps. Similarly, the second data block of 400 kb may be allocated, for transmission, to the second point to point protocol 208b having a bandwidth of 512 kbps. Likewise, the third data block of 150 kb may be allocated, for transmission, to the third point to point protocol 208c having a bandwidth of 256 kbps. Similarly, the fourth data block of 50 kb may be allocated, for transmission, to the fourth point to point protocol 208d having a bandwidth of 128 kbps. It may be noted that instant example is for illustrating the concept only, and the actual distribution may vary.

Further, the plurality of data blocks segregated may be received by the plurality of first VPNs 206a, 206b, 206c and 206d to be encapsulated and transmitted through the plurality of point to point protocol 208a, 208b, 208c and 208d.

The remote virtual private networks 216 may strip encapsulation and may further send it to the second multipath transmission control protocol 214. The second multipath transmission control protocol 214 may assemble the plurality of data blocks in a logical sequence. The second transmission control protocol intercept 212 may modify the multipath transmission control protocol sockets to transmission control protocol sockets to be further sent to the remote destination 120.

In an embodiment, size of the data block allocated to a WWAN among the plurality of WWANs may be proportional to their bandwidth capability.

In an embodiment, the data may be sent through one or few of the WWANs among the plurality of WWANs.

In an embodiment, preference may be given to WWANs based on their bandwidth capability.

In an embodiment, allocation may be made such that least number of WWANs are used for transmitting data packets, while ensuring that buffer time does not exceed a reasonable duration, which may be decided based on the intended application.

III. CONCLUSION

Embodiments provide several advantages, and some of them are mentioned below.

Embodiments may enable live coverage of events even in areas that have poor internet connectivity.

Embodiments may enable live coverage of events with relatively low expenditure.

Embodiments may enable enhanced downloading speed.

Embodiments may enable enhanced uploading speed.

Embodiments may enable live viewing of events such as weddings, birthdays parties, expeditions in remote locations, and graduation ceremonies, among others, by users located in remote locations.

It shall be noted that the processes described above is described as sequence of steps, this was done solely for the sake of illustration. Accordingly, it is contemplated that some steps may be added, some steps may be omitted, the order of the steps may be re-arranged, or some steps may be performed simultaneously.

It may be noted that plurality of VPN and plurality of PPP may be used interchangeably in the disclosure, and shall be construed according to the context.

Although embodiments have been described with reference to specific example embodiments, it will be evident that various modifications and changes may be made to these embodiments without departing from the broader spirit and scope of the system and method described herein. Accordingly, the specification and drawings are to be regarded in an illustrative rather than a restrictive sense.

Many alterations and modifications of the present invention will no doubt become apparent to a person of ordinary skill in the art after having read the foregoing description. It is to be understood that the phraseology or terminology employed herein is for the purpose of description and not of limitation. It is to be understood that the description above contains many specifications, these should not be construed as limiting the scope of the invention but as merely providing illustrations of some of the personally preferred embodiments of this invention. Thus the scope of the invention should be determined by the appended claims and their legal equivalents rather than by the examples given.

I claim:

1. A system for communicating data packets comprising:
   a first device comprising:
      a first processor, wherein the first processor is configured to receive a stream of packets of data from a data source;
      a first multipath transmission control protocol executed on the first processor, wherein the first multipath transmission control protocol configures the first processor to segregate the stream of packets of data into a plurality of data blocks;
      a plurality of first virtual private networks executed on the first processor, wherein each of the plurality of first virtual private networks is configured to receive data blocks based on an allocation made by the first multipath transmission control protocol; and
      a plurality of wireless wide area networks, wherein each of the plurality of wireless wide area networks is associated with at least one of the plurality of first virtual private networks, wherein each of the plurality of wireless wide area networks provides a data path for transmitting one or more data blocks allocated to the associated virtual private network, wherein the first device is configured to prepare data blocks and allocate the data bocks for transmission, such that maximum capacity of the wireless wide area network(s), which is/are already allocated data blocks for transmission, is utilized, before selecting yet another wireless wide area network among the plurality of wireless wide area networks for allocation of the data blocks, to utilize least number of wireless wide area networks for transmission of the data blocks within a desired buffer period; and
   a second device comprising:
      a second processor comprising at least one remote virtual private network, wherein the remote virtual private network is configured to receive the plurality of data blocks transmitted by the plurality of wireless wide area networks; and
      a second multipath transmission control protocol executed on the second processor, wherein the second multipath transmission control protocol configures the second processor to receive the data blocks from the remote virtual private network within the buffer period and assemble the data blocks to obtain a logical sequence of packets of data.

2. The system according to claim 1, wherein the system further comprises a first transmission control protocol intercept in the first device, wherein the first transmission control protocol intercept configures the first processor to modify the stream of packets of data received from the data source in the form of transmission control protocol sockets to multipath transmission control protocol sockets for processing by the first multipath transmission control protocol.

3. The system according to claim 1, wherein the system further comprises a second transmission control protocol intercept in the second device, wherein the second transmission control protocol intercept configures the second processor to modify the data blocks processed by the second multipath transmission control protocol, which is in the form of multipath transmission control protocol sockets to transmission control protocol sockets, thereby enabling transmission of the modified stream of packets of data to at least one remote destination configured to receive the stream of packets of data in the form of transmission control protocol sockets.

4. The system according to claim 1, wherein the first multipath transmission control protocol further configures the first processor to allocate data blocks to one or more first virtual private networks based on performance capability of the plurality of wireless wide area network.

5. The system according to claim 1, wherein the first multipath transmission control protocol monitors each of the plurality of wireless wide area network coordinates for selecting one or more data paths for transmitting the stream of packets of data, wherein the one or more data paths are selected based on size of the stream of packets of data and bandwidth at each of the plurality of wireless wide area networks.

6. The system according to claim 1, wherein the second device is configured to receive the stream of packets of data from a source and process the data to segregate it into the plurality of data blocks, wherein the first device is configured to receive the plurality of data blocks through at least one of the plurality of wireless wide area networks, wherein the first device process the data to be transmitted to at least one remote destination.

7. A method for communicating data packets comprising:
   receiving a stream of packets of data;
   dividing the packets of data into data blocks;
   transmitting the data blocks via one or more virtual private networks among a plurality of virtual private networks, wherein maximum capacity of wireless wide area network(s), among a plurality of wireless wide area networks corresponding to the plurality of virtual private networks, which is/are already allocated data blocks for transmission, is utilized, before selecting yet another wireless wide area network, among the plurality of wireless wide area networks, for allocation of the data blocks, to utilize least number of wireless wide area networks for transmission of the data blocks within a desired buffer period;
   receiving the transmitted data blocks at a remote virtual private network within the buffer period; and
   arranging the data blocks to obtain a logical sequence of data blocks.

8. The method according to claim 7, further comprising associating each of the plurality of virtual private networks with a respective wireless wide area network among a plurality of wireless wide area networks.

9. The method according to claim 7, wherein dividing is done to enable transmission using the least number of virtual private networks within the desired buffer period.

10. The method according to claim 7, wherein size of data block allocated to the virtual private network for transmission is proportional to bandwidth capability of the virtual private network.

* * * * *